(12) United States Patent
Spiro

(10) Patent No.: US 9,626,847 B2
(45) Date of Patent: Apr. 18, 2017

(54) SYSTEMS AND METHODS FOR EMERGENCY EGRESS AND MONITORING SYSTEM

(71) Applicant: Exposure Illumination Architects, Inc., Scottsdale, AZ (US)

(72) Inventor: Daniel S. Spiro, Paradise Valley, AZ (US)

(73) Assignee: Exposure Illumination Architects, Inc., Scottsdale, AZ (US)

(*) Notice: Subject to any disclaimer, the term of this patent is extended or adjusted under 35 U.S.C. 154(b) by 0 days.

(21) Appl. No.: 14/806,585

(22) Filed: Jul. 22, 2015

(65) Prior Publication Data

US 2016/0027267 A1 Jan. 28, 2016

Related U.S. Application Data

(60) Provisional application No. 62/027,717, filed on Jul. 22, 2014.

(51) Int. Cl.

| G08B 23/00 | (2006.01) |
|---|---|
| G08B 7/06 | (2006.01) |
| H02J 9/06 | (2006.01) |
| H04L 29/08 | (2006.01) |
| H05B 37/02 | (2006.01) |
| G08B 29/18 | (2006.01) |

(52) U.S. Cl.
CPC ........... *G08B 7/066* (2013.01); *G08B 29/181* (2013.01); *H02J 9/06* (2013.01); *H04L 67/125* (2013.01); *H05B 37/0227* (2013.01)

(58) Field of Classification Search
CPC .... G05B 23/02; G05B 2219/13; G06Q 10/06; G08B 7/066; G08B 29/181; H02J 9/06; H04L 67/125; H05B 37/0227
USPC ........ 340/517, 539.14–539.17, 691.1–691.6, 340/692, 693.2
See application file for complete search history.

(56) References Cited

U.S. PATENT DOCUMENTS

| 2008/0309486 A1 | 12/2008 | McKenna et al. |
| 2012/0063039 A1 | 3/2012 | Shah et al. |
| 2014/0167969 A1 | 6/2014 | Wedig et al. |

*Primary Examiner* — Thomas Mullen
(74) *Attorney, Agent, or Firm* — The Noblitt Group, PLLC

(57) ABSTRACT

Various embodiments of the present technology may comprise a system disposed within a structure comprising a network of individually addressed devices, wherein each device comprises a microcontroller electrically connected to a communication module, an output module, and/or a sensor module. The sensor module may produce data of an environmental condition and may transmit a signal to the microcontroller based on the data. The microcontroller may receive and processes the signal from the sensor module to identify a detected event and selectively activates at least one of the output module and the sensor module based on the detected event. The selectively activated output module and sensor module may located within the same device as the microcontroller and/or any number of devices in the network.

42 Claims, 12 Drawing Sheets

LEGEND 102A and 102B = Local Microcontroller
104A and 104B = Power Modulator
136 = Power Line
140A and 140B = Power Distribution Module 206 = Dedicated Power Supply
208 = Test Module

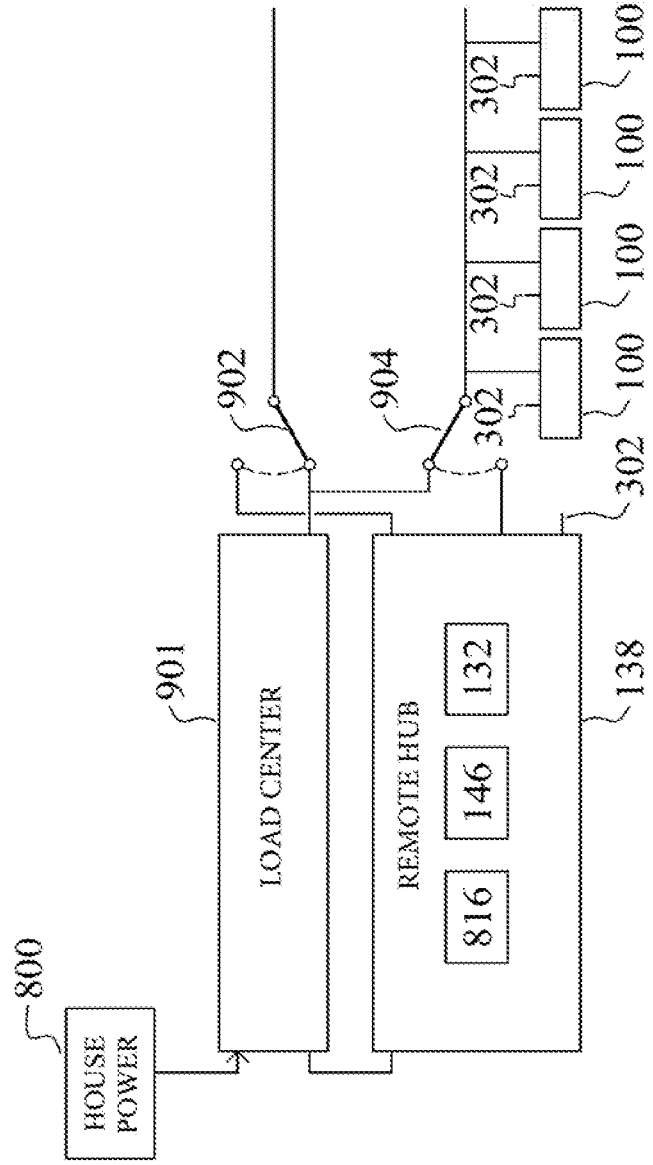

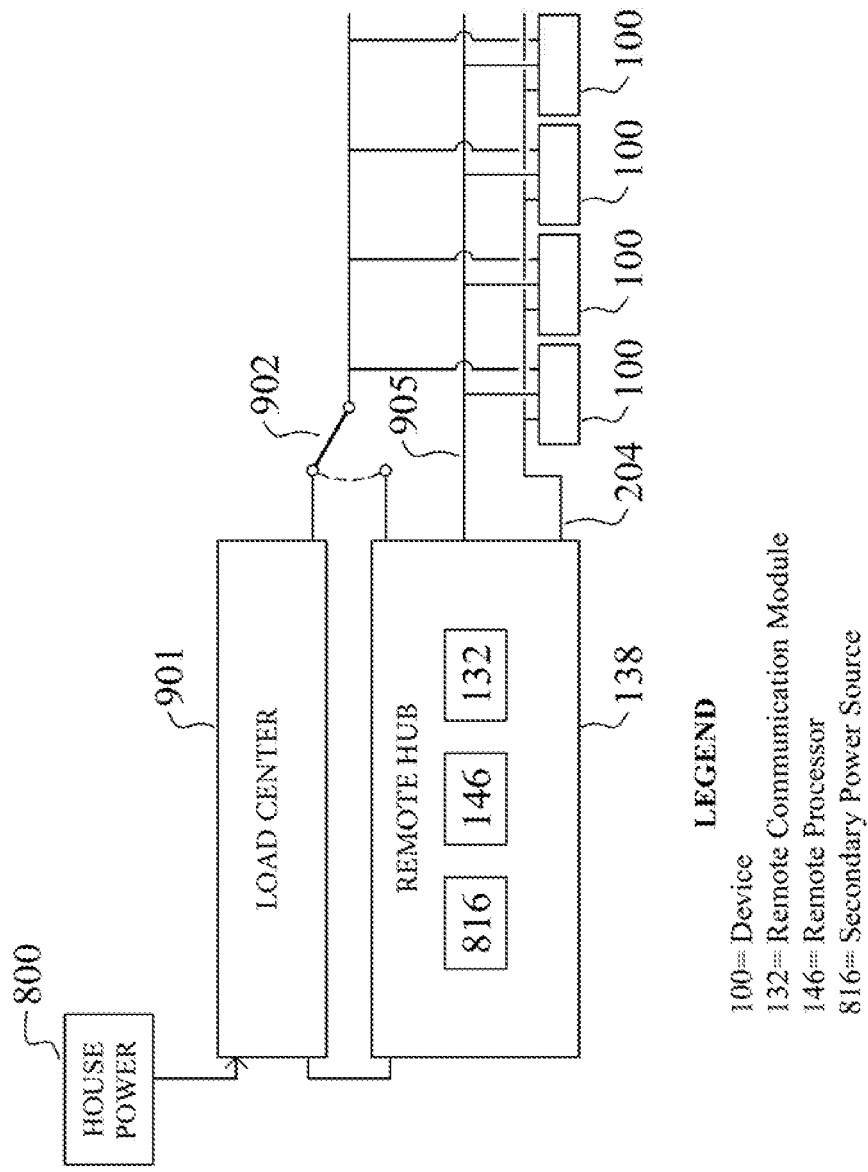

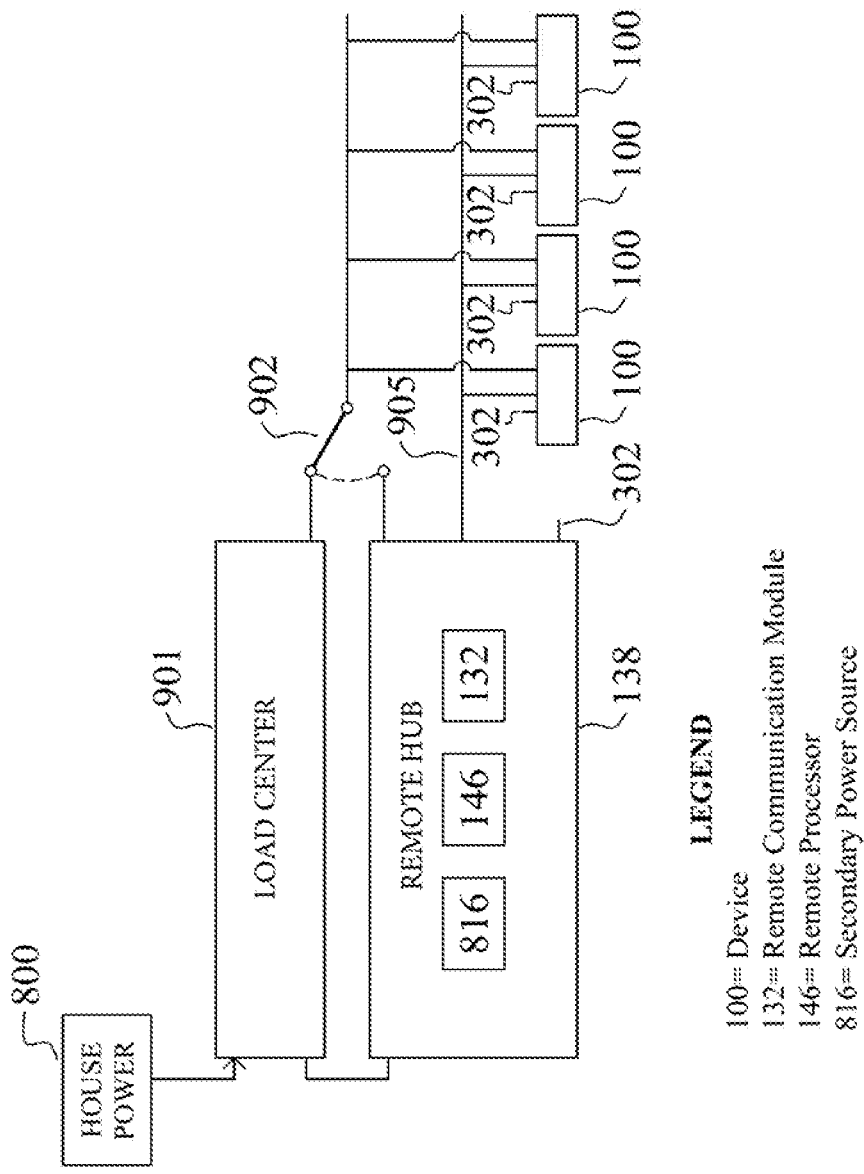

SYSTEMS AND METHODS FOR EMERGENCY EGRESS AND MONITORING SYSTEM

CROSS-REFERENCE TO RELATED APPLICATION

This application claims the benefit of U.S. Provisional Patent Application No. 62/027,717, filed Jul. 22, 2014, and incorporates the disclosure of such application in its entirety by reference. To the extent that the present disclosure conflicts with the referenced application, however, the present disclosure is to be given priority.

BACKGROUND OF THE TECHNOLOGY

To protect life, code mandates the use of egress emergency lighting in commercial, institutional, and industrial buildings. Egress lighting design considerations account for the area of space to be lighted, the occupant load in the space, and the shortest distance of travel between occupants and nearest legal exit doors. Placement of overhead egress lighting, therefore, is over main non-obstructed circulation paths. Egress luminaries are available as stand-alone units or incorporated into ambient lighting luminaries and have functionality limited to providing lighting.

Code mandates that in the event of power interruption, auxiliary emergency power illuminates the egress path. The auxiliary power may be located in overhead luminaries employing batteries, or a remote location employing inverters or generators. However, maintaining short-lived batteries and lamps at high and often difficult to reach places can be costly. Further, the failure rate is unpredictable, requiring unscheduled maintenance to comply with code requirements. Current lamp technology requiring large and heavy inverters is inefficient and typically requires provisions for venting, making the implementation costly. The alternative to the inverter is the use of the generator, however, a generator must be placed outside the building on a specially constructed pad and screening, creates noise while operating, requires special exhaust methods. The generator is more costly and there is also an increased risk of theft.

SUMMARY

Various embodiments of the present technology may comprise a system disposed within a structure comprising a network of individually addressed devices, wherein each device comprises a microcontroller electrically connected to a communication module, an output module, and/or a sensor module. The sensor module may produce data of an environmental condition and may transmit a signal to the microcontroller based on the data. The microcontroller may receive and processes the signal from the sensor module to identify a detected event and selectively activates at least one of the output module and the sensor module based on the detected event. The selectively activated output module and sensor module may located within the same device as the microcontroller and/or any number of devices in the network.

BRIEF DESCRIPTION OF THE DRAWING

A more complete understanding of the present technology may be derived by referring to the detailed description when considered in connection with the following illustrative figures. In the following figures, like reference numbers refer to similar elements and steps throughout the figures.

FIGS. 9A-D illustrate circuit diagrams of exemplary embodiments of a networked system of devices using wired and wireless communication.

Figure 1:
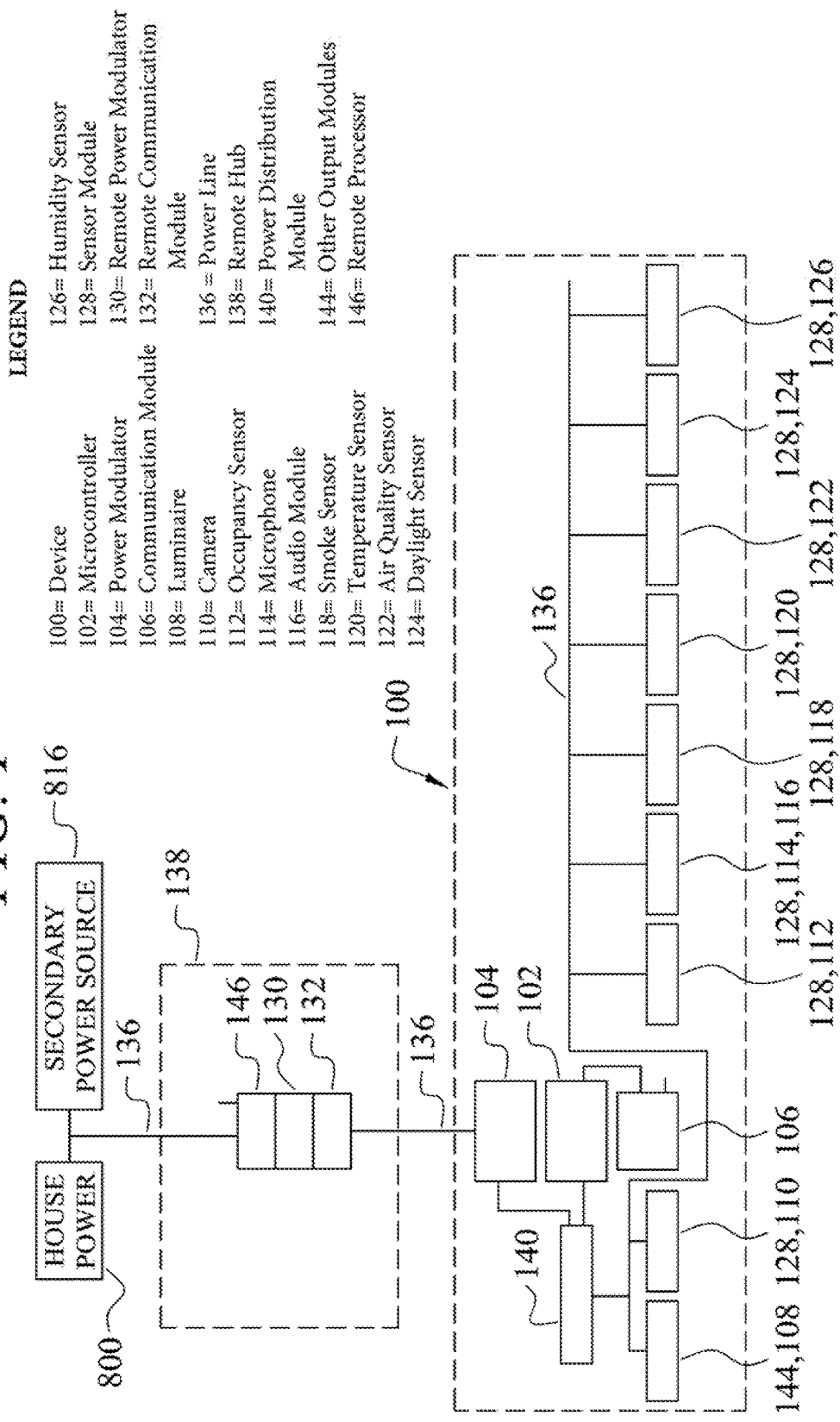
FIG. 1 representatively illustrates a block diagram of an exemplary system according to an embodiment of the present technology.

Elements and steps in the figures are illustrated for simplicity and clarity and have not necessarily been rendered according to any particular sequence or scale. For example, steps that may be performed concurrently or in different order are illustrated in the figures to help to improve understanding of embodiments of the present technology.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various process steps, apparatus, systems, methods, etc. In addition, the present technology may be practiced in conjunction with any number of systems and methods for providing emergency and monitoring systems, and the system described is merely one exemplary application for the technology. Further, the present technology may employ any number of conventional techniques for installing, controlling, enhancing, retrofitting, monitoring, updating, and/or replacing emergency and monitoring systems.

The particular implementations shown and described are illustrative of the technology and its best mode and are not intended to otherwise limit the scope of the present technology in any way. For the sake of brevity, conventional manufacturing, connection, preparation, and other functional aspects of the system may not be described in detail. Furthermore, the connecting lines shown in the various figures are intended to represent exemplary functional relationships and/or steps between the various elements. Many alternative or additional functional relationships or physical connections may be present in a practical system.

Various representative implementations of the present technology may be applied to any suspended systems and other systems, such as ceiling or wall mounted systems, within a structure. Certain representative implementations may include, for example, systems or methods for providing light in indoor, outdoor, commercial, and/or residential areas. In an exemplary embodiment, a system according to various aspects of the present technology may include a light source, such as a lamp including a light emitting diode. In some embodiments, the system may be connected mechanically and/or electrically to at least one other external system. Certain representative implementations may also include other components in addition to or instead of the light sources, such as environmental sensors such as motion sensors and/or photocell sensors for controlling the use and/or the intensity of the light, components for a surveillance system, audio modules such as speakers, alarms, and noise cancelling devices, cameras, antennas, air quality sensors, thermal sensors, smoke sensors, humidity sensors, and other components that may be deployed near the ceiling or walls.

Various embodiments of the present technology may provide a system comprising a plurality of devices that facilitates consolidation and/or integration of multiple components on a single device, which may expand functionality and/or adaptability of the system and conserve time and cost of installation and operation. In various embodiments, the device may provide a power and communication wire that at least partially integrates lighting, sound, security, fire protection, surveillance, data, and communication and environmental control devices on one platform.

In various embodiments of the present technology, the system may optimize power and/or operational efficiency for all devices, enhance functionality by enabling cross-communication among devices in the system, enhance interior operational environment through better illumination, sound quality, noise control, security and safety device integration, air quality control, and the like. The system may provide adaptability of design, reconfiguration, and maintenance within the structure, reducing costs of ownership, construction, operation, and maintenance.

Referring to FIGS. 1-7, an exemplary embodiment of the system 142 comprising a device 100 may comprise an output module 144 such as a luminaire 108, a sensor module 128 such as an occupancy sensor 112, a power modulator 104, and/or a communication module 106. The sensor modules 128 may sense, monitor, record, and/or report data corresponding to an environmental condition in the structure. In various embodiments, the data may be captured in real time as the environmental condition occurs and/or recorded. The output modules 144 may alert and/or inform occupants of the structure about the environmental condition. In some embodiments, one or more components of the device 100 may be housed in a single housing 310. In other embodiments, the components may be housed in multiple separate housing structures, or may have no housing. In some embodiments, the device 100 may perform multiple functions such as emergency lighting, smoke detection, fire alarm alert, security, public announcement, thermal detection, and/or optical functionality.

Referring to FIG. 1, the device 100 may comprise multiple components such as a luminaire 108, power modulator 104, one or more sensor modules 128, local microcontroller 102, power distribution module 140, power line 136, and/or communication module 106. The sensor modules 128 may comprise an occupancy sensor 112, an audio module 116 such as a speaker, a microphone 114, a camera 110, a smoke sensor 118, a temperature sensor 120, an air quality sensor 122, a daylight sensor 124, and a humidity sensor 126. The device 100 may be electrically connected to a remote hub 138, which may comprise a remote processor 146, a remote power modulator 130, and a remote communication module 132.

In various embodiments, the luminaire 108 and/or a sensor module 128 such as the camera 110 may have a dedicated electrical connection to the power distribution module 140. The power distribution module 140 may provide the luminaire 108 and/or the camera 110 with an optimal input voltage, while the sensor modules 128 may be electrically connected to the microcontroller 102. In various embodiments, the arrangement of the sensor modules 128 and luminaire 108 (or other output modules 144) may be configured in any arrangement as dictated by each components' voltage requirements.

Figure 2:
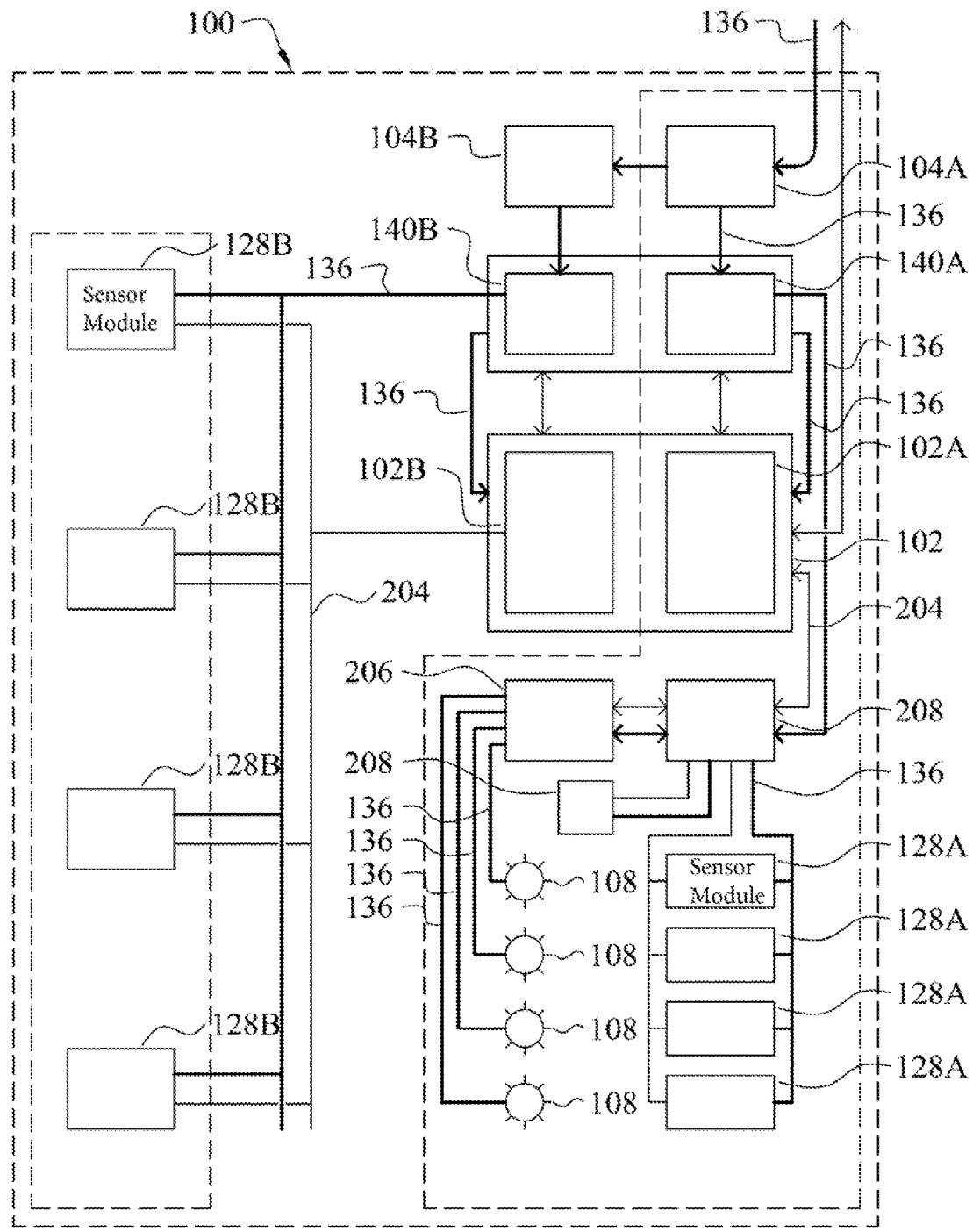
FIG. 2 representatively illustrates a block diagram of an exemplary system according to another embodiment of the present technology.

In another embodiment, as illustrated in FIG. 2, the device 100 may comprise more than one separate electrical circuit, where each electrical circuit provides dedicated power 136 and communication paths 204 to the components of the device. For example, the device 100 may comprise multiple power modulators 104A and 104B, dedicated power supply 206, multiple power distribution modules 140A and 140B, and multiple local microcontrollers 102A, 102B. As illustrated, the first power modulator 104A, the first power distribution module 140A, and the first local microcontroller 102A, are configured as a separate circuit providing power 136 and communication paths 204 to the luminaire 108, and selected sensor modules 128A. Conversely, the second power modulator 104B, the second power distribution module 140B, and the second local microcontroller 102B may be configured as a separate circuit proving power 136 and communication paths 204 to selected sensor modules 128B. In some embodiments, one or more of the power modulator 104, the power distribution module 140, and the local microcontroller 102 may be used to achieve any desired electrical arrangement and communication path.

In some embodiments of the present technology, the device 100 may comprise a test module 208. The test module 208 may be configured to allow testing of electrical circuits to verify electrical conductivity and to verify that a particular component is functioning properly. In some embodiments, at least one of the local microcontroller 102 and the remote processor 146 may assess and report diagnostic data in real time to the test module 208 about the operational readiness of each device 100 in the network.

Figure 3:
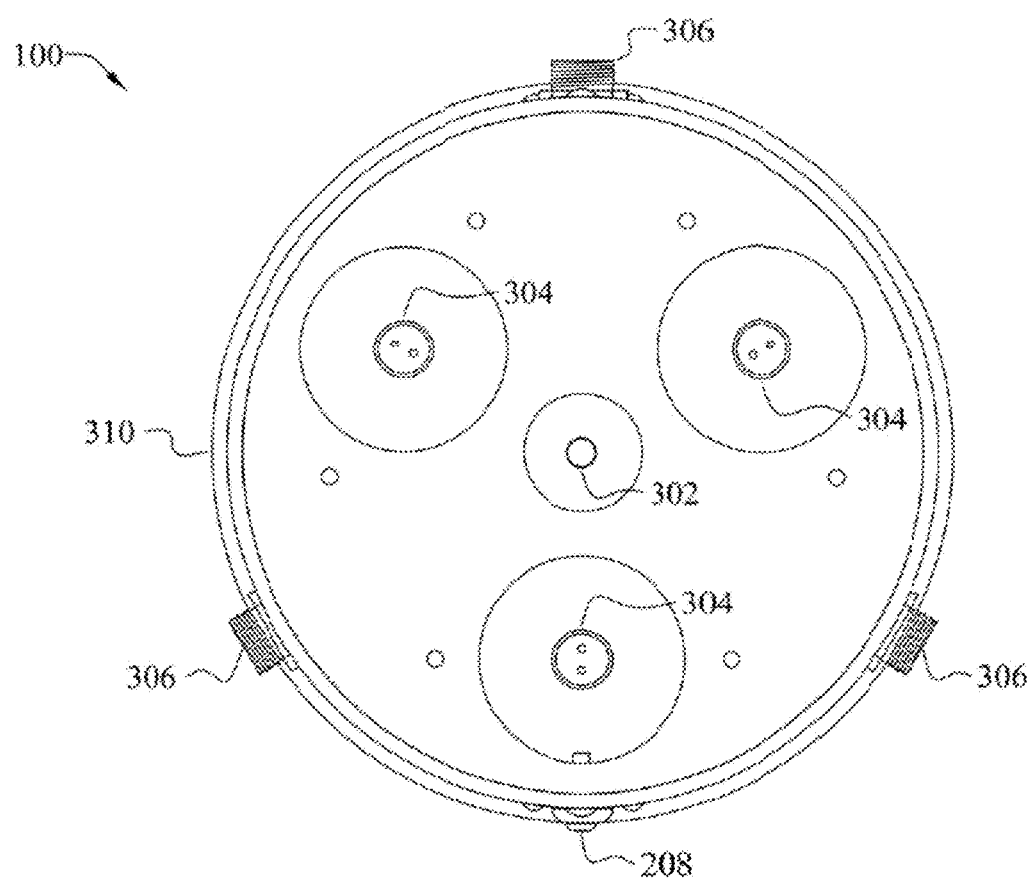
FIG. 3 representatively illustrates a bottom view of an exemplary housing of a device.

FIGS. 3 (bottom view) and 4 (perspective view) illustrate an exemplary arrangement of receptacles 304, luminaire receptacles 306, and an antenna 302 of device 100 into a single housing 310. The housing 310 may provide one or more receptacles 304 and may be arranged in any suitable configuration. The receptacles 304 maybe configured to accept any one of the sensor modules 128 and/or output modules 144, such that the sensor modules 128 and output modules 144 may be interchangeable.

In various embodiments, the sensor modules 128 may comprise any suitable sensor for detecting an environmental condition such as air temperature, noise, air particulates, light levels, motion, and the like. For example, the sensor modules 128 may comprise the occupancy sensor 112, the speaker 116, the microphone 114, the camera 110, the smoke sensor 118, the temperature sensor 120, the air quality sensor 122, the daylight sensor 124, and the humidity sensor 126. In various embodiments, the output modules 144 may comprise any suitable device for alerting and/or informing occupants of the structure about the sensed environmental condition. For example, the output module 144 may comprise the luminaire 108, a strobe light (not shown), and/or an audio module such as a speaker, a noise cancellation device, an alarm, and the like (not shown). In various embodiments, the sensor module 128 may produce data of a sensed environmental condition and transmit a signal to the local microcontroller 102 based on the data.

Figure 4:
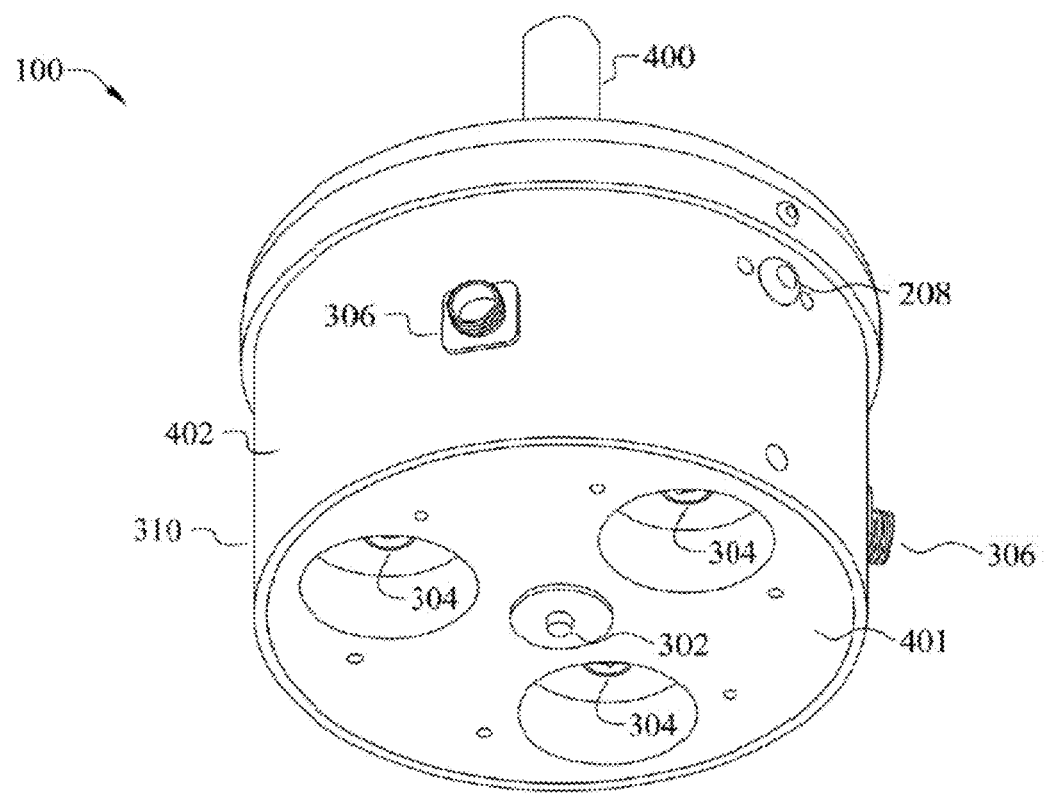
FIG. 4 representatively illustrates a perspective view of the exemplary housing of the device.

The sensor modules 128 and output modules 144 may be arranged in any suitable configuration. FIGS. 3 and 4 illustrate receptacles 304 for coupling the sensor modules 128 and/or output modules 144 to the bottom of the housing 310 and luminaire receptacles 306 on the side of the housing 310 for coupling the output modules 144 comprising the luminaire 118. However, the receptacles 304 and luminaire receptacles 306 may be disposed in any suitable location in the housing 310 to maximize performance of each module. The housing 310 may provide one or more lighting power receptacles 306 configured to provide electrical connectivity to the light source 108. FIG. 4 illustrates an arrangement providing three (3) light sources 108, however there may be any number of lighting power receptacles 306 and any number of light sources 108 connected to the lighting power receptacle 306.

Figure 5:
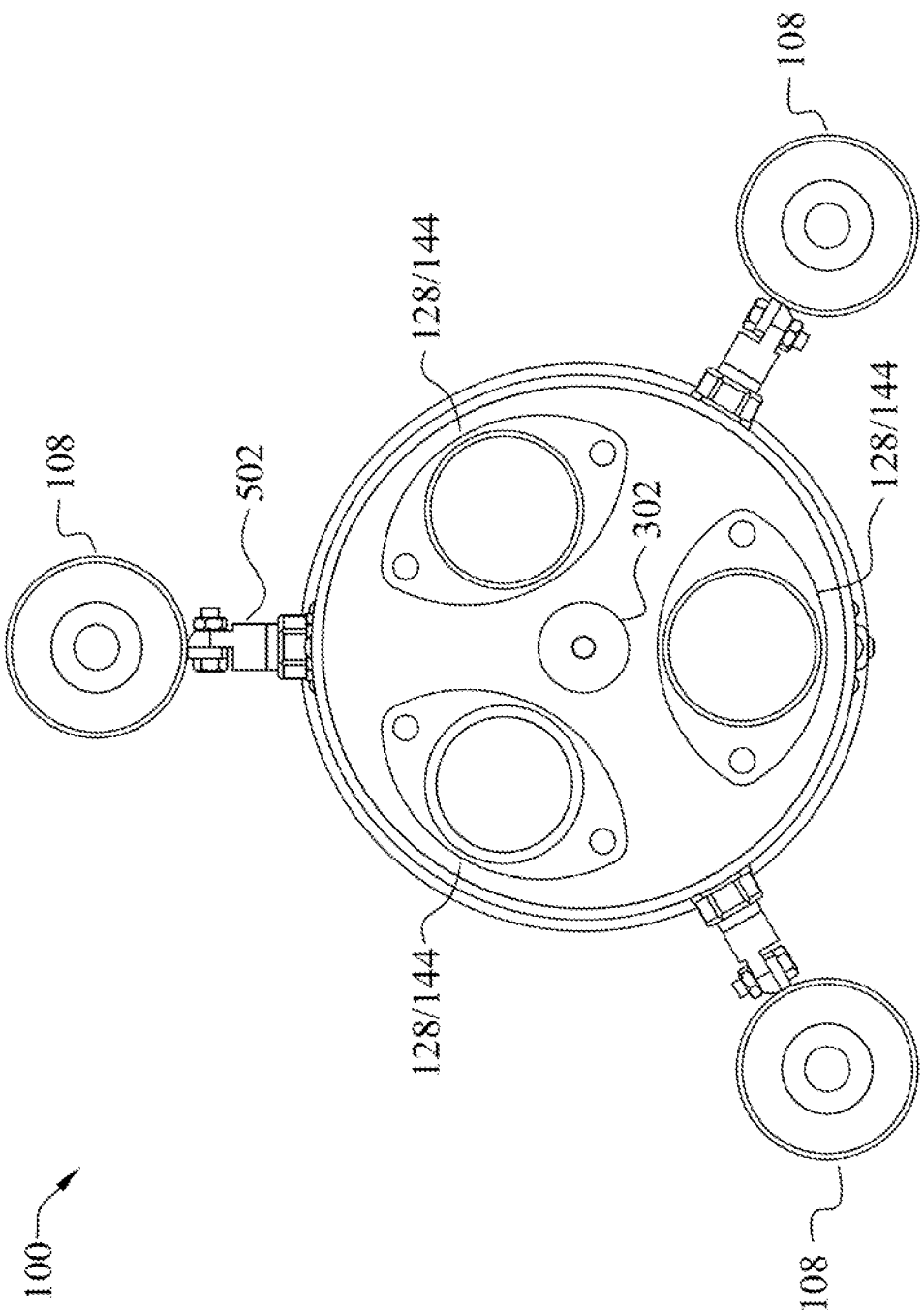
FIG. 5 representatively illustrates a bottom view of an exemplary device.
Figure 6:
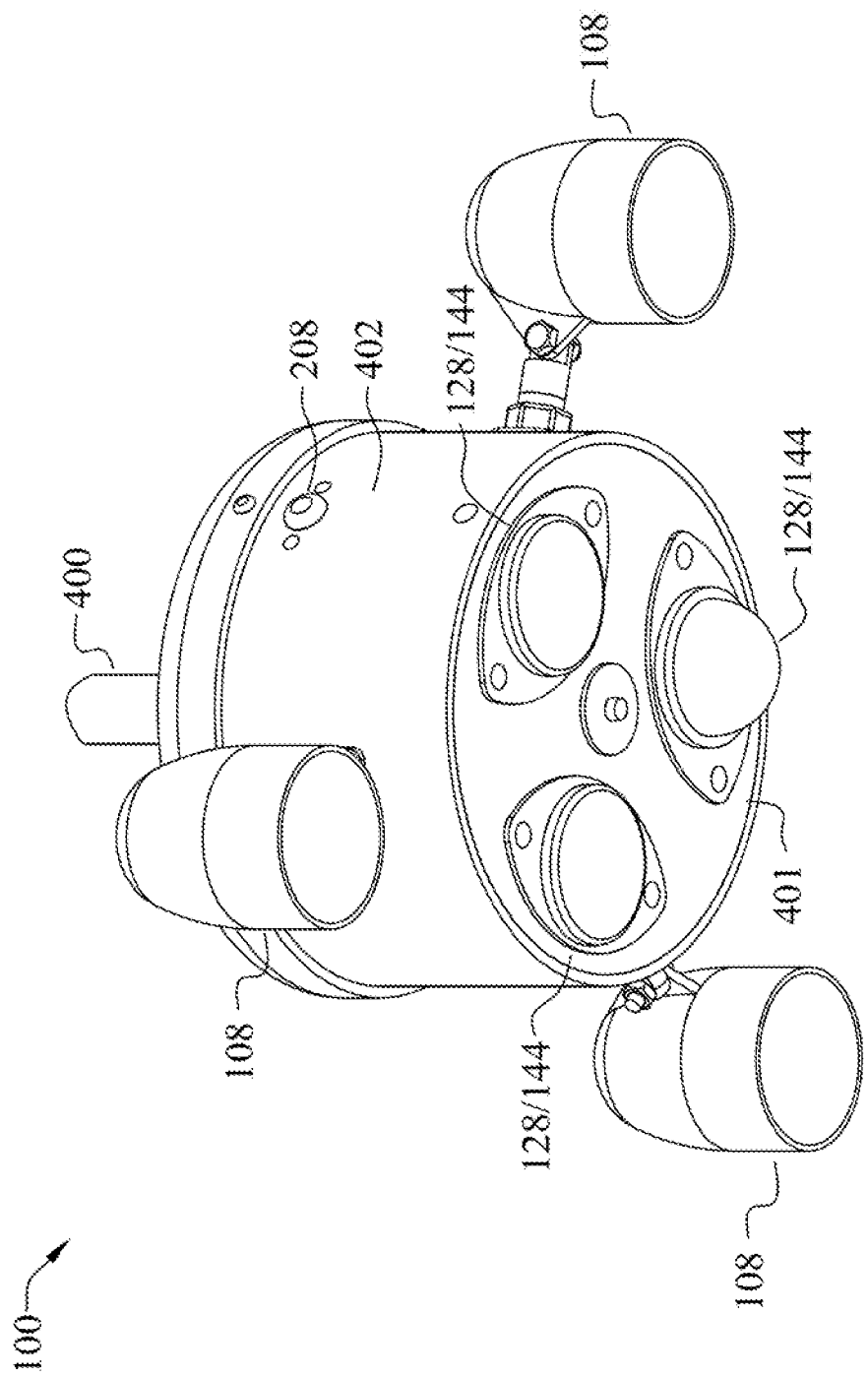
FIG. 6 representatively illustrates a perspective view of the exemplary device.

FIGS. 5 (bottom view) and 6 (perspective view) illustrate an exemplary embodiment of the device 100 wherein the sensor modules 128 and/or output modules 144 have been connected to the receptacles 304, and the lighting sources 108 have been connected to the luminaire receptacles 306. In one embodiment, the light source 108 may be configured to extend out from the housing 310 through an arm 502 configured to mate to the lighting power receptacle 306. In other embodiments, the light source 108 may be connected to the lighting power receptacle 306 without the arm 502.

In various embodiments, the housing 310 may be constructed of any suitable material to provide protection to interior components and circuitry. In some embodiments, the housing 310 may be constructed of a rigid, water-proof, and/or heat resistant material, such as metal or a composite material. In some embodiments, the housing 310 may comprise a bottom section 401, one or more sidewalls 402 and a top section (not shown). FIG. 4 illustrates one embodiment of the sidewall 402 as one continuous cylinder, however the sidewall 402 may comprise other shapes and/or may be constructed of multiple pieces. The bottom section 401 may be configured to provide openings for the receptacle 304 to mate with the various monitoring modules 128. For example, FIGS. 3-6 illustrate embodiments of the device 100 comprising 3 openings and 3 receptacles on the bottom section 401. However, in various embodiments, there may be any number of openings and receptacles 304. In various embodiments, the openings and receptacles 304 may be located on any part of the housing 310. For example, the housing 310 may comprise openings and receptacles 304 on the sidewall 402 and/or on a top surface.

In one embodiment, the housing 310 may be coupled to any surface such as a wall or ceiling with any suitable mechanical and/or electrical connector and/or fastener. For example, the housing 310 may be coupled to a ceiling using a wire, a bolt, a chain, and combinations thereof to suspend the housing 310 from a ceiling. In another embodiment, the housing 310 may be coupled to the surface with a conduit 400 that may comprise a lumen for electrical and/or communication lines.

In exemplary embodiments of the present technology, the device 100 may comprise one or more luminaires 108. The luminaire 108 may comprise light emitting diode(s) (LEDs), florescent lighting, incandescent lighting, high-intensity discharge lighting (HID), or any other suitable lighting device. In one embodiment, the luminaire 108 may comprise any suitable LED such as a red-green-blue LED and/or a phosphor converted LED. In one embodiment, the luminaire 108 may comprise multiple LEDs that may be configured to be flat, a cluster, and/or a bulb. The luminaire 108 may be configured to emit white light, colored light, or combinations thereof. In one embodiment, the LEDs may comprise gallium-based crystals such as gallium nitride, indium gallium nitride, and/or gallium aluminum phosphide. In one aspect of the embodiment, the LEDs may comprise an additional material such as phosphorus to produce white light. For example, a phosphor material may convert monochromic light from a blue or UV LED to broad-spectrum white light. The luminaire 108 may comprise any lighting device known to one skilled in the art either now existing or hereinafter produced, developed, or implemented in the future.

In exemplary embodiments of the present technology, the device 100 may comprise a local microcontroller 102, wherein "local" refers to the microcontroller within the device 100. The local microcontroller 102 may comprise a central processing unit and memory. The local microcontroller 102 may receive and processes the signal from the sensor module 128 to identify the detected event and selectively activates at least one of the output module 144 and the sensor module 128 based on the detected event. The selectively activated output module 144 and sensor module 128 may be located within the same device 100 as the local microcontroller 102 and/or any number of devices 100 in a network of devices 100. In some embodiments, the microcontroller may communicate the detected event and instructions for selective activation of the output module 144 and sensor module 128 to the local microcontrollers 102 of other devices 100 in the network.

The local microcontroller 102 may be formed on a single integrated circuit and may comprise a central processing unit, local memory, and programmable input/output peripherals. For example, the local microcontroller 102 may provide ROM, EPROM, EEPROM, or flash memory. The local microcontroller 102 may be configured to send and receive data from the sensor modules 128 and/or output modules 144 via the input/output peripherals. The input/output peripherals may provide an electrical connection providing power and data to modules connected to the local microcontroller 102. For example, the local microcontroller 102 may be programmed using any suitable programming language, for example, C, C++, Java, Python, PHP, JavaScript, Ruby, and SQL. In some embodiments, the local microcontroller 102 may be individually addressable. In some embodiments, the local microcontroller 102 may be equipped with a UART or a USART to transmit and receive communication to and from a peripheral device port.

In exemplary embodiments of the present technology, the device 100 may comprise a communication module 106. The communication module 106 may be configured to receive and transmit data. In some embodiments, the communication module 106 may be electrically connected to the local microcontroller 102 and configured to communicate with the local microcontroller 102 within the same device 100 and/or the local microcontrollers 102 in other devices 100. In some embodiments, the communication module 106 may facilitate communication between the local microcontroller 102 and the remote hub 138.

Data may be transmitted or received on a communication line and may be in the form of analog or digital transmission. Any suitable communication protocol may be used to transmit data, for example, TCP, UDP, ICMP, HTTP, POP, FTP, IMAP, GIOP, RMI, DCOM, DDE, SOAP, where the communication protocol may be implemented by hardware, software, or a combination thereof. The communication protocol may establish any of the following: data formats for data exchange, address formats for data exchanged, address mapping, routing, detection of transmission errors, acknowledgment of correct reception of data, detection of loss of information, sequence control, and flow control. For example, a specific device 100 may be distinguished from other devices 100 by individual addressing of the communication module 106. The communication module 106 of one device 100 may provide communication to the communication module 106 of another device 100, or may provide communication to a remote control system. The communication module 106 may be wireless or wired, for example, receipt or transmission of data may be communicated through optical fiber, power line, and/or a wireless signal such as infrared, Bluetooth, and/or radio frequency.

In various embodiments of the present technology, the device 100 may comprise an occupancy sensor 112. In some embodiments, the occupancy sensor 112 may be coupled to the local microcontroller 102 with at least one of a mechanical and electrical connector, such as an electrical wire. The occupancy sensor 112 may be directed to the area below the device 100 to detect the movement within the detection range of the occupancy sensor 112. The occupancy sensor 112 may sense the presence or absence of movement in the structure and may communicate data relating to the movement to the local microcontroller 102.

In various embodiments of the present technology, the device may comprise an audio module 116. According to various aspects of these embodiments the audio module 116 may be coupled to the microcontroller for at least one of a mechanical and electrical connection between the audio module and the microcontroller, such as for providing power to the audio module 116. The audio module 116 may comprise any suitable components to project sound such as a speaker, a piezoelectric device, and a waveguide. The audio module 116 may project any desired sound such as announcements, music, and/or an alarm. The audio module 116 may also provide noise cancellation.

In some embodiments of the present technology, the output module 144 may be electrically connected to the local microcontroller 102. In some embodiments, the output module 144 of the device 100 may comprise at least one of an audio module, a luminaire 108, a strobe light (not shown), and/or a microphone 114. The microphone 114 may convert sound into an electrical signal by electromagnetic induction, capacitance change, or piezoelectricity. According to various aspects of these embodiments, the microphone 114 may be coupled to the microcontroller, and configured to communicate audio data to the local microcontroller 102.

In some embodiments of the present technology, the sensor module 128 of the device 100 may be electrically connected to the local microcontroller 102 and comprise camera 110, such as a video camera. The camera 110 may be configured to monitor the behavior, activities, and other changing information of the environment by providing real-time images of the environment. The camera 110 may have the ability to analyze the imagery, such as monitor traffic flow in the space, track and record data relating to occupants' behavior, identify risks to the occupants and/or the property, such as spilled liquids or blocked access paths. The camera 110 may also provide live video feed of the area within the vicinity of the surveillance system 110. The camera 110 may also provide general occupancy detection, such as motion detection, and a daylight sensor to monitor light levels.

In some embodiments of the present technology, the sensor module 128 of the device 100 may comprise a smoke sensor 118 configured to detect smoke, which typically indicates fire. The smoke sensor 118 may be configured to detect smoke by photoelectric detection, ionization, or a combination thereof. According to various aspects of these embodiments, the smoke sensor 118 may be coupled to the local microcontroller 102, and configured to communicate data to the local microcontroller 102. In some embodiments, the smoke sensor 118 may be integrated in the air quality sensor 122.

In some embodiments of the present technology, the sensor module 128 of the device 100 may comprise a temperature sensor 120 (thermostat) configured to detect heat energy or coldness in the environment. The temperature sensor 120 may comprise any suitable temperature detector such as a mercury thermometer, bimetallic mechanical or electrical sensors, electronic thermistor and semiconductor devices, and/or electrical thermocouple. According to various aspects of these embodiments, the temperature sensor 120 may be coupled to the local microcontroller 102 and configured to communicate data to the local microcontroller 102.

In some embodiments of the present technology, the sensor module 128 of the device 100 may comprise an air quality sensor 122. The air quality sensor 122 may be configured to sample the air to insure acceptable levels of gases, such as oxygen, to detect harmful air contaminates, such as carbon monoxide, radon gas, harmful chemicals, and biological organisms. According to various aspects of these embodiments, the air quality sensor 122 may be coupled to the local microcontroller 102 and configured to communicate data to the local microcontroller 102.

In some embodiments of the present technology, the sensor module 128 of the device 100 may comprise a daylight sensor 124. The daylight sensor 124 may comprise any suitable sensor for controlling the light source by detecting daylight levels, for example, photocells. The daylight sensor 124 may sense the light levels in the area around the device and communicate the light levels to the local microcontroller 102 to maintain or modify the light emitted from the light source. For example, the local microcontroller 102 and/or the remote processor 146 may activate the light source 108 when low daylight levels are detected.

In some embodiments of the present technology, the sensor module 128 of the device 100 may comprise a humidity sensor 126 configured to measure the relative humidity in the air. The humidity sensor 126 may comprise a capacitive type humidity sensor, a CMOS capacitor to frequency converter and an EEPROM used to hold the calibration factors. According to various aspects of these embodiments, the humidity sensor 126 may be coupled to the local microcontroller 102, and configured to communicate relative humidity levels in the air to the local microcontroller 102. In some embodiments, the humidity sensor 126 may be integrated in the air quality sensor 122.

In various embodiments, the device 100 may be configured receive power from any suitable power source such as standard alternating current or direct current. The device may also be configured to operate on a low voltage system such as 24 volt input power. In some embodiments, the device 100 may receive power from a secondary power source such as a battery powered back-up system after loss of a primary power source. In various embodiments, the secondary power source may comprise a battery, a generator, a fuel cell, and/or any other suitable source of power.

Figure 7:
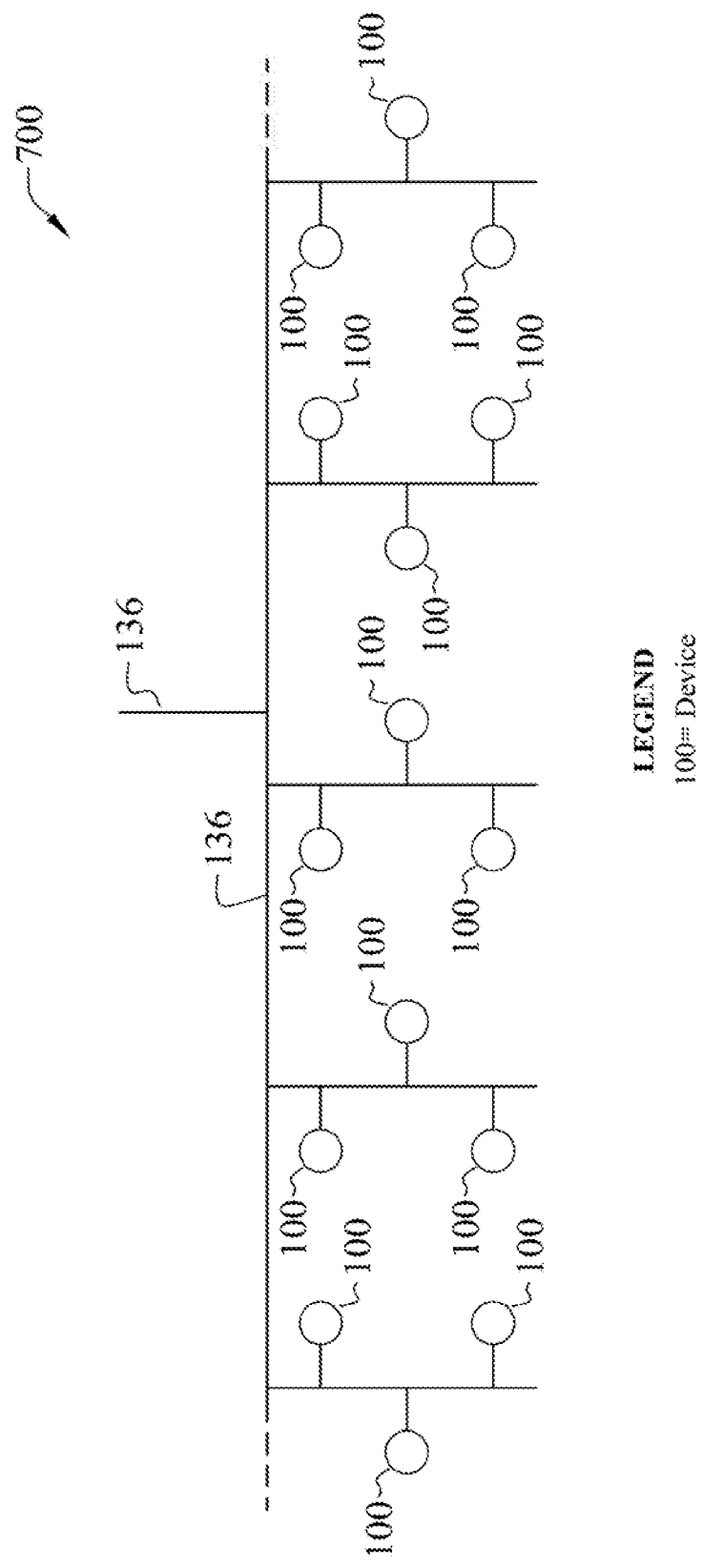
FIG. 7 representatively illustrates an exemplary embodiment of a networked system comprising multiple devices.

Referring now to FIG. 7, one or more devices 100 may be electrically connected to form a networked system 700 of individually addressed devices 100. The networked system 700 may be electrically connected to the remote hub 138

(not shown, see FIG. 1). The devices 100 may be placed on any surface such as the walls and/or on the ceilings in the structure to illuminate an optimal path of egress. For example, as shown in FIG. 7, the devices 100 may be located above aisles and/or main paths of egress to illuminate the area below. FIG. 7 illustrates one configuration of the networked system 700 of devices 100, however, any suitable configuration and/or physical placement of the devices 100 may be used to achieve the desired illumination.

In some embodiments, the networked system 700 may be assembled by providing electrical connections and communication between each device 100 and the remote hub 138. For example, the remote processor 146 (not shown, see FIG. 1) and remote communication module 132 (not shown, see FIG. 1) may allow each device 100 to communicate with the remote hub 138. In some embodiments, the remote processor 146 may be configured to receive and process data from the local microcontroller 102 and communicate with the communication module 146 in each device 100 to selectively activate at least one of the output module 144 and the sensor module 128 in one or more individually addressed devices 100 based on the detected event. In some embodiments, remote processor 146 may be configured to communicate with an external system, such as the structure's HVAC or the fire department, to at least one of report the detected event, send instructions to change an environmental condition in the structure, and receive instructions to selectively activate at least one of the output module 144 and the sensor module 128 in one or more individually addressed devices 100 based on the detected event. However, in some embodiments, the remote hub 138 may not be present and the network system 700 may function with data processing and instructions provided by the local microcontrollers 102.

In various embodiments, the system 142 may comprise the remote hub 138 comprising a remote processor 146 to track and process information received from the individually addressable devices 100. The remote hub 138 may also be configured with a remote communication module 132 to transmit data to a specific device 100 within the network 700 based on its individual address. For example, the remote hub 138 may establish the physical location in space of the specific device 100 based on the device's 100 individual address. Establishing the physical location with the individual address may be achieved through mapping the networked system 700. For example, the physical location and individual address may be programmed into the remote processor 146, such that when information is received from a device 100, the remote hub 138 may process the data from the device 100 and determine the physical location of the sensory data being received. Coupling the received sensory data with the individual address may allow the remote hub 138 to transmit data to the local microcontroller 102 of the device 100. For example, the remote hub 138 may receive sensory data from a device 100 which indicates smoke or fire. The remote hub 138 may then transmit data to that particular device 100 and surrounding devices 100 to alert the immediate area to be evacuated, while allowing the other devices 100 in the networked system 142 to continue to function normally.

Figure 8:
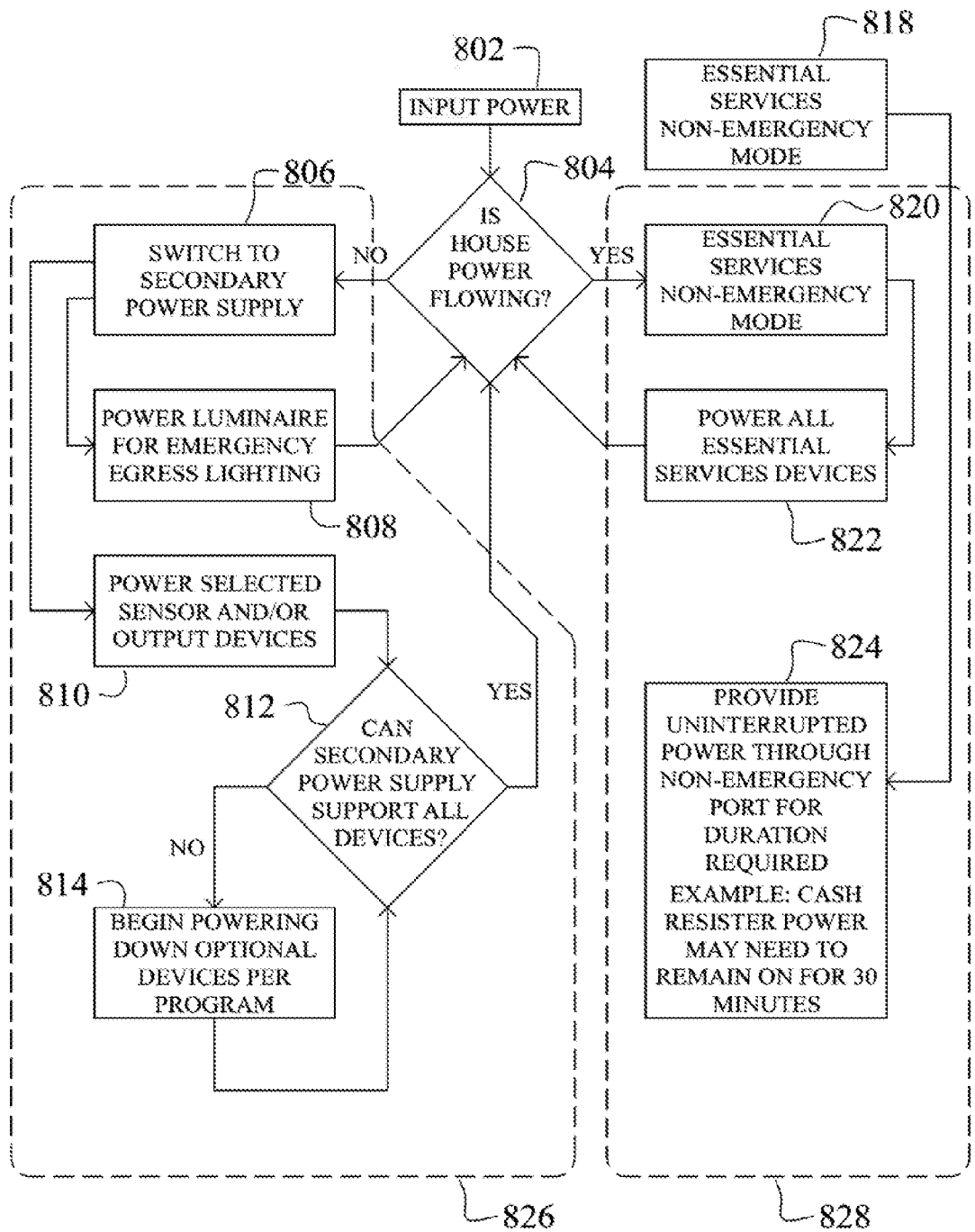
FIG. 8 is a flow chart illustrating a representative exemplary embodiment of the operation of the system of the present technology.

Referring now to FIG. 8, an exemplary embodiment of the present technology may be configured to operate as a dual-mode system 142 based on the power source wherein one or more devices 100 within the system 142 may operate in a main power mode 820 or a secondary power mode 818. In an exemplary embodiment, the system 142 may be powered by a main power source to the structure ("house power") (800) or may be powered by the secondary power source (816). For example, when the system 142 is powered with the main power source, the system 142 is in the main power mode (820), and when the system 142 is operating with the secondary power source (816), the system 142 is operating in the secondary power mode (818).

The system 142 may be configured to receive power from a main power source (800). The main power source (800) may then be routed to the input (802) of the system 142, such as a circuit box. In one embodiment, if the main power source 800 is active (820), then the system 142 will operate the main power mode (828, 804). For example, when operating in main power mode (828), the main power source (800) may power all electrical devices within the building, including lighting, HVAC, electrical outlets, and the system 142 having one or more devices 100 (822).

In one embodiment, if the main power source (800) is interrupted such as in a power outage, then the system 142 may be configured to detect the loss of power and signal to receive power from the secondary power source (816). For example, if main power (800) is interrupted, the system 142 may operate in secondary power mode (826), utilizing the secondary power source (816), until the main power source (800) is restored. In one embodiment, if the system 142 is in secondary power mode, the system 142 may be configured to provide power to select devices 100 or to select sensor modules 128 and/or output modules 144 (810). For example, the luminaire 108 may be illuminated to provide emergency egress lighting (808). In another embodiment, the system 142 may be configured to provide power via the secondary power source (816) to electrical components within the structure for a selected period of time (824), such as electrical outlets powering cash registers. This selective power distribution may allow the system 142 to conserve the secondary power source (816).

In operation, the system 142 may be configured to calculate the amount of power needed to support all of the select devices 100 and/or the sensor modules 128 and/or output modules 144 (812). In some embodiments, the local microcontroller 102 may monitor power consumption of the sensor modules 128 and/or output modules 144. If the secondary power source (816) will not able to support all of the select devices 100, the sensor modules 128, and/or output modules 144, then the system 142 may sequentially power down their operation based on the need for their operation to respond to the detected event. For example, if the secondary power source (816) is powering all sensor modules 128 and/or output modules 144 in the devices 100 comprising luminaire 108, camera 110, humidity sensor 126, smoke sensor 118, and audio module 116, and the system detects a fire, then the system may be programmed to power down the humidity sensor 126 while maintaining power to the luminaire 108, camera 110, and smoke sensor 118, and audio module 116. Powering down certain sensor modules 128 and/or output modules 144 may conserve power while continuing to monitor the presence of the detected event, provide emergency egress lighting, and/or announce at least one of a visual and audible warning to identify the location of the detected event and aid in its avoidance.

The detected event may be any event or environmental condition triggered by sensory data received by the sensor modules 128 located within each device 100. In some embodiments, the detected event may be determined to be an emergency corresponding to a hazardous environmental condition. For example, the detected event may be a fire triggered by the smoke sensor, heat above a preselected threshold temperature, smoke, hazardous fumes, gas leak, instability of the structure, chemical contaminants, biological contaminants, and/or radiological contaminants. The detected event may be unauthorized access by a person, triggered by the camera or occupancy sensor 112. In some embodiments, the detection of the hazardous environmental condition may trigger the selective activation of one or more output modules 144 comprising a luminaire 108 to illuminate an optimal path of egress out of the structure. The path of egress may be illuminated according to a pre-selected path out of the structure and/or based on avoidance of the location of the hazardous environmental condition within the structure. In some embodiments, the detection of the hazardous environmental condition may trigger one or more output modules 144 to announce at least one of a visual and audible warning to identify the location of the detected event in the structure and aid in its avoidance by occupants of the structure.

In some embodiments, detected event may be determined to be a nonemergency corresponding to a nonhazardous environmental condition. The detection of nonhazardous environmental condition may comprise sensing changes in ambient environmental conditions in the structure such as temperature and light levels. For example, the sensor module 128 comprising a thermostat may detect a warm air temperature near produce in the structure and trigger activation of an external system such as the structure's air conditioner to maintain pre-selected ambient temperature conditions in the area of the produce.

In various embodiments, the system 142 may be configured to assign a priority to each device 100, or to particular sensor modules 128 and/or output modules 144 within the device 100 based on the detected event. In some embodiments, the output modules 144 and/or sensor modules 128 may be assigned a priority based on power consumption and powered according to the assigned priority such that the output modules 144 and sensor modules 128 that are assigned a higher priority are powered preferentially over those assigned with a lower priority during interruption of the primary power source. In some embodiments, such as an emergency, the output module 144 comprising the luminaire 108 may be assigned the highest priority for receiving power to ensure egress lighting is on for egress of the occupants of the structure.

In one example, two events may be detected, for example a fire may be detected by the smoke sensor and the main power source 800 may be interrupted, triggering the power from the secondary power source (816). Any number of events may be detected with any combination of sensory data. For example, a combination of certain sensory data received from the sensor devices 128 may indicate one or more detected events, while another combination of sensory data may indicate a different detected event(s).

In an exemplary embodiment of the present technology, the networked system 700 may be configured to provide occupants of the structure with information specific to the detected event. The remote hub 138 may be configured to transmit data to devices 100 in a certain physical location or vicinity to provide specific alerts to the occupants within the area affected by the detected event. For example, the luminaires 108 of particular devices 100 may illuminate to provide occupants with the safest route of egress in order to avoid a detected event or condition, such as a fire. In another example, the audio module 116 of the device 100 may sound an alarm to alert occupants to avoid an area wherein the detected event is a chemical spill.

Referring now to FIGS. 9A-D, the system may comprise a main power supply 800. In some embodiments, the main power supply 800 may be configured as a direct current or an alternating current input power supply. The main power supply 800 may be configured to supply power to the remote hub 138. The remote hub 138 may further comprise the secondary power source 816, such as a battery or a generator, the remote processor 146, and the remote communication module 132. The remote communication module 132 may be configured to transmit and receive data from one or more devices 100. Transmission of data may be wired, or may be wireless, such as optical fiber, infrared, Bluetooth, and/or radio frequency. In various embodiments, the system 142 may transmit data through data wires 204 for wired communication or may transmit data wirelessly with the antenna 302. In some embodiments, the main power 800 may be configured to provide power to a load center 901, for example, a breaker box, an electrical box, or a fuse box. The load center 901 may provide electrical circuits to power one or more devices 100 and other electrical components within the building, such as electrical outlets. The load center 901 may be electrically connected to a first switching mechanism 902. The first switching mechanism 902 may be configured to switch between the load center and the secondary power source 816. The first switching mechanism 902 may be activated by changes in voltage levels, current levels, or frequency of the circuit. The first switching mechanism 902 may be implemented by hardware, software, or a combination thereof.

Figure 9A:
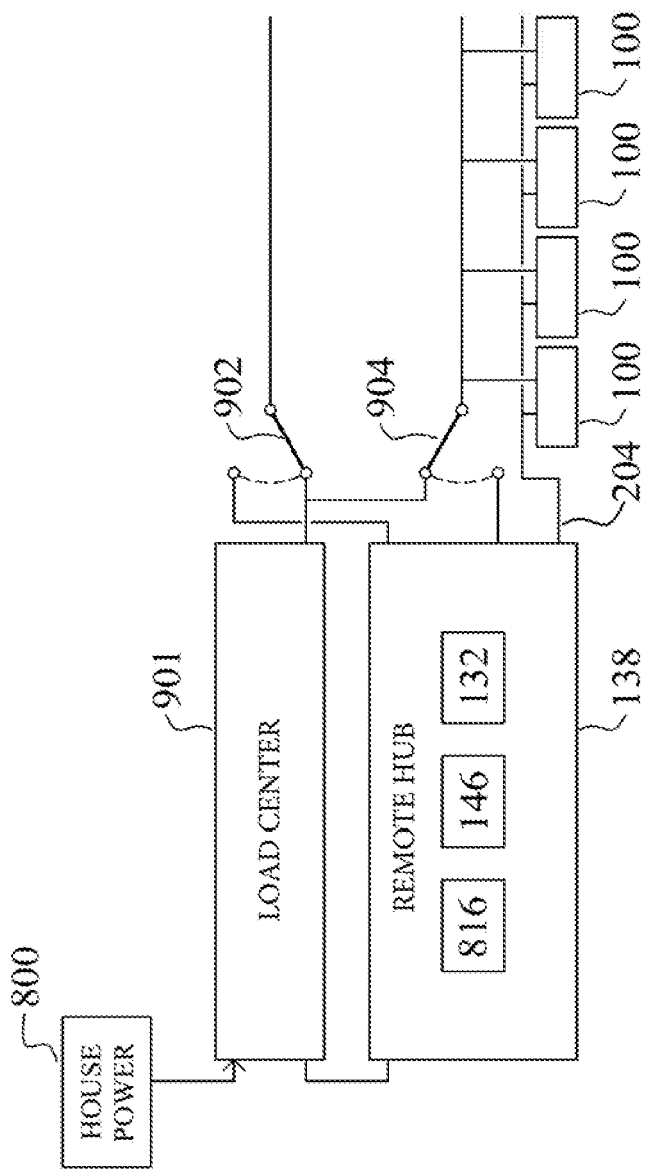

In one embodiment, as illustrated in FIGS. 9A and 9B, the remote hub 138 may be electrically connected to a second switching mechanism 904. The second switching mechanism 904 may be configured to switch between the load center 901 and the secondary power source 816. The second switching mechanism 904 may be activated by changes in voltage levels, current levels, or frequency of the circuit. The second switching mechanism 904 may be implemented by hardware, software, or a combination thereof.

The second switching mechanism 904 may be electrically connected to one or more devices to provide power to components of the device. For example, during standard operation, the first switching mechanism 902 may be electrically connected to the load center 901 providing power to the building's electrical components, while the second switching mechanism 904 is electrically connected to the load center 901 to provide power to the one or more devices 100. In the event of power interruption, the first switching mechanism 902 switches from the load center 901 to the secondary power source 816 to continue to provide power to the building's electrical components. The second switching mechanism 904 switches from the load center to the secondary power source 816 to provide power to the one or more devices 100, including output module 108 and sensor modules 128.

In another embodiment, as illustrated in FIGS. 9C and 9D, the secondary power source 816 may be electrically connected to provide a constant source of power to the one or more devices 100. In some embodiments, the one or more devices 100 may be configured to receive power from the load center 901. For example, during standard operation, the constant power source provided by the secondary power source 816 may power some components of the device 100, such as the output module 108, while the load center 901 may power any one of the other components of the device 100 and the building's electrical components. In the event of power interruption, the first switching mechanism 902 switches from the load center 901 to the secondary power source 816 to continue to provide power to all components of the device 100.

In the foregoing description, the technology has been described with reference to specific exemplary embodiments. Various modifications and changes may be made, however, without departing from the scope of the present technology as set forth. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any appropriate order and are not limited to the explicit order presented in the specific examples. Additionally, the components and/or elements recited in any system embodiment may be combined in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition, system, or apparatus that comprises a list of elements does not include only those elements recited, but may also include other elements not expressly listed or inherent to such process, method, article, composition, system, or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology.

The invention claimed is:

1. A system disposed within a structure suitable for human occupants, the system comprising:
    a network of individually addressed devices, wherein each device comprises:
    a microcontroller comprising a central processing unit and memory;
    a communication module electrically connected to the microcontroller;
    one or more output modules electrically connected to the microcontroller; and
    one or more sensor modules configured to sense a particular environmental condition in the structure and electrically connected to the microcontroller, wherein the one or more sensor modules produces data corresponding to the sensed environmental condition and transmits a signal to the microcontroller based on the data,
    wherein the microcontroller is configured to receive and process the signal from the one or more sensor modules to identify the particular sensed environmental condition and:
        selectively activate at least one of the one or more output modules and one or more sensor modules based on a need to respond to the particular sensed environmental condition;
        communicate the particular sensed environmental condition and instructions to the microcontrollers of the other devices in the network for selective activation of the at least one of the one or more output modules and the one or more sensor modules in the other devices; and
        assign a priority to each of the one or more output modules and the one or more sensor modules for sequential power-down based on the particular sensed environmental condition when the system is receiving inadequate power.

2. The system of claim 1, wherein the particular environmental condition is determined to be an emergency corresponding to a hazardous environmental condition.

3. The system of claim 2, wherein the selectively activated one or more output modules comprise a luminaire to illuminate an optimal path of egress out of the structure.

4. The system of claim 3, wherein the optimal path of egress out of the structure is pre-selected or based on avoidance of the location of the particular environmental condition in the structure.

5. The system of claim 2, wherein the hazardous environmental condition comprises at least one of heat above a preselected threshold temperature, smoke, hazardous fumes, gas leak, instability of the structure, chemical contaminants, biological contaminants, and radiological contaminants.

6. The system of claim 2, wherein the sensed hazardous environmental condition triggers the one or more output modules to announce a warning that is at least one of visual and audible to identify the location of the particular environmental condition in the structure and aid the occupants of the structure in its avoidance.

7. The system of claim 1, wherein the particular environmental condition is determined to be a nonemergency corresponding to a nonhazardous environmental condition.

8. The system of claim 7, wherein the sensed nonhazardous environmental condition triggers selective activation of an external system to maintain pre-selected ambient conditions in the structure.

9. The system of claim 1, further comprising a remote processor configured to receive and process data from the microcontroller and communicate with the communication module in each device to selectively activate at least one of the output module and the sensor module in one or more individually addressed devices based on the particular environmental condition.

10. The system of claim 9, wherein the remote processor is configured to communicate with an external system to at least one of: report the particular environmental condition, send instructions to change the particular environmental condition in the structure, and receive instructions to selectively activate at least one of the output module and the sensor module in one or more individually addressed devices based on the particular environmental condition.

11. The system of claim 10, wherein the external system comprises an HVAC system.

12. The system of claim 9, wherein the communication module of each device is configured to communicate with the microcontroller within the device, the communication module of another device, and the remote processor through at least one of power line communication, and a wireless signal.

13. The system of claim 9, wherein at least one of the microcontroller and the remote processor assesses and reports diagnostic data in real time about the operational readiness of each device in the network.

14. The system of claim 1, wherein the network of devices are configured to receive power from a primary power source and a secondary power source.

15. The system of claim 14, wherein the secondary power source comprises at least one of a battery, a generator, and a fuel cell.

16. The system of claim 14, wherein the secondary power source is activated and provides power to the one or more output modules and the microcontroller of each device when the primary power source is interrupted.

17. The system of claim 16, wherein the microcontroller monitors power consumption of the one or more output modules and the one or more sensor modules.

18. The system of claim 1, wherein power is allocated to the one or more output modules and one or more sensor modules that are assigned a higher priority over those assigned with a lower priority when the system receives inadequate power.

19. The system of claim 18, wherein the one or more output modules comprise a luminaire that is assigned the highest priority when the system is receiving inadequate power.

20. The system of claim 18, further comprising a local power management module electrically connected to the microcontroller, wherein the local power management module is configured to provide power to the one or more output modules and the one or more sensor modules based on their assigned priority.

21. The system of claim 1, wherein at least one of the microcontroller, the communication module, the one or more output modules, and the one or more sensor modules within each device is coupled to and at least partially disposed within a housing.

22. The system of claim 21, wherein the housing comprises one or more receptacles, wherein the receptacle comprises at least one of an electrical connection and a mechanical connection configured to receive the one or more output modules and the one or more sensor modules.

23. The system of claim 1, wherein the one or more sensor modules comprises at least one of an occupancy sensor, a camera, a smoke sensor, a thermostat, an air quality sensor, a daylight sensor, and a humidity sensor.

24. The system of claim 1, wherein the one or more output modules comprises at least one of an audio module, a luminaire, and a strobe light.

25. An emergency egress system disposed within a structure suitable for human occupants, the system comprising:
a network of individually addressed devices, wherein each device comprises:
a microcontroller comprising a central processing unit and memory;
a communication module electrically connected to the microcontroller;
one or more output modules electrically connected to the microcontroller;
one or more sensor modules configured to sense a particular environmental condition in the structure and electrically connected to the microcontroller, wherein the one or more sensor modules produces data corresponding to the sensed environmental condition and transmits a signal to the microcontroller based on the data, and
wherein the microcontroller is configured to receive and process the data from the one or more sensor modules to identify the particular sensed environmental condition based on the data and determine whether the particular sensed environmental condition is an emergency or nonemergency; and
a remote processor configured to communicate with at least one of:
the communication module in each device to selectively activate at least one of the one or more output modules and the one or more sensor modules in one or more individually addressed devices based on a need to respond to the particular sensed environmental condition; and
an external system, wherein the identification of the particular sensed environmental condition determined to be an emergency triggers the selective activation of the one or more output modules to at least one of:
illuminate an optimal path of egress out of the structure; and
announce a warning that is at least one of visual and audible to identify the location of the particular sensed environmental condition in the structure and aid the occupants of the structure in its avoidance; and
wherein the identification of the particular sensed environmental condition determined to be a nonemergency triggers selective activation of at least one of the output module and an external system to maintain pre-selected ambient conditions in the structure; and
wherein priority is assigned to each of the one or more output modules and the one or more sensor modules for sequential power-down based on the particular sensed environmental condition when the emergency egress system is receiving inadequate power.

26. The system of claim 25, wherein the particular sensed environmental condition determined to be the emergency corresponds to a hazardous environmental condition.

27. The system of claim 26, wherein the hazardous environmental condition comprises at least one of heat above a preselected threshold temperature, smoke, hazardous fumes, gas leak, instability of the structure, chemical contaminants, biological contaminants, and radiological contaminants.

28. The system of claim 25, wherein the optimal path of egress out of the structure is illuminated by the one or more output modules, wherein the one or more output modules comprise a luminaire.

29. The system of claim 28, wherein the optimal path of egress out of the structure is pre-selected or based on avoidance of the location of the particular sensed environmental condition in the structure.

30. The system of claim 28, wherein the one or more output modules comprising the luminaire is assigned the highest priority when the emergency egress system is receiving inadequate power.

31. The system of claim 25, wherein the particular sensed environmental condition determined to be a nonemergency corresponds to a nonhazardous environmental condition.

32. The system of claim 25, wherein the remote processor communicates with the external system to at least one of report the particular sensed environmental condition, send instructions to change the particular sensed environmental condition in the structure, and receive instructions to selectively activate at least one of the one or more output modules and the one or more sensor modules in one or more individually addressed devices based on the particular sensed environmental condition.

33. The system of claim 25, wherein the network of devices are configured to receive power from a primary power source and a secondary power source.

34. The system of claim 33, wherein the secondary power source comprises at least one of a battery and a generator.

35. The system of claim 33, wherein the secondary power source is activated and provides power to the one or more output modules and the microcontroller of each device when the primary power source is interrupted.

36. The system of claim 25, wherein the microcontroller monitors power consumption of the one or more output modules and the one or more sensor modules.

37. The system of claim 25, further comprising a local power management module electrically connected to the microcontroller, wherein the local power management module is configured to provide power to the one or more output modules and the one or more sensor modules based on their assigned priority.

38. The system of claim 25, further comprising a housing with one or more receptacles, wherein the receptacle comprises at least one of an electrical connection and a mechanical connection configured to receive the one or more output modules and the one or more sensor modules.

39. A method of evacuating occupants from a structure, comprising:
coupling a network of individually addressed devices to the structure, wherein each device comprises:
a microcontroller comprising a central processing unit and memory;
a communication module electrically connected to the microcontroller;
one or more output modules electrically connected to the microcontroller; and
one or more sensor modules configured to sense a particular environmental condition and electrically connected to the microcontroller,
wherein the one or more sensor modules produces real time data corresponding to the particular sensed environmental condition and transmits a signal to the microcontroller based on the data,
wherein the microcontroller is configured to receive and process the data from the one or more sensor modules to identify the particular sensed environmental condition based on the data;
communicatively linking a remote processor to the network of individually addressed devices, wherein the remote processor is configured to communicate with at least one of:
the communication module in each device to selectively activate at least one of the one or more output modules and the one or more sensor modules in one or more individually addressed devices based on a need to respond to the particular sensed environmental condition; and
an external system;
providing power to the remote processor and each of the devices, wherein the power is provided by at least one of a primary and a secondary power source;
assigning a priority to each of the one or more output modules and the one or more sensor modules for sequential power-down based on the particular sensed environmental condition when the network of individually addressed devices is receiving inadequate power; and
activating the one or more output modules in response to the particular sensed environmental condition to provide an optimal path of egress for the evacuating occupants.

40. The method of claim 39, further comprising determining the presence of an emergency wherein the particular sensed environmental condition is a hazardous environmental condition.

41. The method of claim 40, wherein the sensed hazardous environmental condition triggers the selective activation of the one or more output modules, wherein the one or more output modules comprise a luminaire to illuminate the optimal path of egress out of the structure.

42. The system of claim 41, wherein the optimal path of egress out of the structure is pre-selected or based on avoidance of the location of the particular sensed environmental condition in the structure.

* * * * *